United States Patent
Rigney et al.

(10) Patent No.: US 8,432,629 B1
(45) Date of Patent: Apr. 30, 2013

(54) DISK DRIVE CENTERING SYNC FRAMES ON SYNC MARKS OF A SPIRAL TRACK

(75) Inventors: Brian P. Rigney, Louisville, CO (US); Steven C. Smith, San Jose, CA (US); Yakov M. Lifchits, San Jose, CA (US); Boworn Panyavoravaj, Lumlookka (TH)

(73) Assignee: Western Digital Technologies, Inc., Irvine, CA (US)

( * ) Notice: Subject to any disclaimer, the term of this patent is extended or adjusted under 35 U.S.C. 154(b) by 161 days.

(21) Appl. No.: 13/113,955

(22) Filed: May 23, 2011

(51) Int. Cl.
*G11B 5/02* (2006.01)

(52) U.S. Cl.
USPC .............................. 360/27; 369/75

(58) Field of Classification Search ........................ None
See application file for complete search history.

(56) References Cited

U.S. PATENT DOCUMENTS

| | | | |
|---|---|---|---|
| 5,668,679 A | 9/1997 | Swearingen et al. |
| 5,754,352 A | 5/1998 | Behrens et al. |
| 6,005,727 A | 12/1999 | Behrens et al. |
| 6,021,012 A | 2/2000 | Bang |
| 6,091,564 A | 7/2000 | Codilian et al. |
| 6,191,906 B1 | 2/2001 | Buch |
| 6,292,318 B1 | 9/2001 | Hayashi |
| 6,304,407 B1 | 10/2001 | Baker et al. |
| 6,411,453 B1 | 6/2002 | Chainer et al. |
| 6,507,450 B1 | 1/2003 | Elliott |
| 6,519,107 B1 | 2/2003 | Ehrlich et al. |
| 6,587,293 B1 | 7/2003 | Ding et al. |
| 6,704,156 B1 | 3/2004 | Baker et al. |
| 6,738,205 B1 | 5/2004 | Moran et al. |
| 6,920,004 B1 | 7/2005 | Codilian et al. |
| 6,924,960 B1 | 8/2005 | Melkote et al. |
| 6,937,420 B1 | 8/2005 | McNab et al. |
| 6,943,978 B1 | 9/2005 | Lee |
| 6,967,799 B1 | 11/2005 | Lee |
| 6,985,316 B1 | 1/2006 | Liikanen et al. |
| 6,987,636 B1 | 1/2006 | Chue et al. |
| 6,989,954 B1 | 1/2006 | Lee et al. |
| 7,002,761 B1 | 2/2006 | Sutardja et al. |
| 7,019,937 B1 | 3/2006 | Liikanen et al. |
| 7,088,533 B1 | 8/2006 | Shepherd et al. |
| 7,136,253 B1 | 11/2006 | Liikanen et al. |
| 7,145,744 B1 | 12/2006 | Clawson et al. |
| 7,212,364 B1 | 5/2007 | Lee |
| 7,230,786 B1 | 6/2007 | Ray et al. |
| 7,248,426 B1 | 7/2007 | Weerasooriya et al. |
| 7,333,280 B1 | 2/2008 | Lifchits et al. |
| 7,382,564 B1 | 6/2008 | Everett et al. |
| 7,391,584 B1 | 6/2008 | Sheh et al. |
| 7,411,758 B1 | 8/2008 | Cheung et al. |
| 7,522,370 B1 | 4/2009 | Sutardja |
| 7,551,387 B2 | 6/2009 | Sun et al. |
| 7,561,361 B1 | 7/2009 | Rutherford |
| 7,639,445 B2 | 12/2009 | Matsunaga et al. |

(Continued)

*Primary Examiner* — Paul Huber

(57) ABSTRACT

A disk drive is disclosed comprising a head actuated over a disk comprising a plurality of spiral tracks. A first sync frame is first opened in response to a first frame offset during a first revolution of the disk, wherein the first sync frame corresponds to the head approaching a first sync mark in a first spiral track crossing. A first sync frame position error signal (PES) is generated representing a difference between a target framing of the first sync frame around the first sync mark and a detected framing of the first sync frame around the first sync mark. The first frame offset is adjusted in response to the first sync frame PES, and during a second revolution of the disk the first sync frame is second opened in response to the adjusted first frame offset.

20 Claims, 13 Drawing Sheets

U.S. PATENT DOCUMENTS

| | | |
|---|---|---|
| 7,639,446 B2 | 12/2009 | Mizukoshi et al. |
| 7,656,604 B1 | 2/2010 | Liang et al. |
| 7,675,705 B2 | 3/2010 | Mizukoshi et al. |
| 7,715,143 B2 | 5/2010 | Bliss et al. |
| 7,733,588 B1 | 6/2010 | Ying |
| 7,737,793 B1 | 6/2010 | Ying et al. |
| 7,751,144 B1 | 7/2010 | Sutardja |
| 7,852,598 B1 | 12/2010 | Sutardja |
| 7,881,004 B2 | 2/2011 | Kumbla et al. |
| 7,881,005 B1 | 2/2011 | Cheung et al. |
| 2006/0171059 A1 | 8/2006 | Chan et al. |
| 2007/0070538 A1 | 3/2007 | Lau et al. |
| 2007/0076314 A1 | 4/2007 | Rigney |
| 2007/0211367 A1 | 9/2007 | Lau et al. |

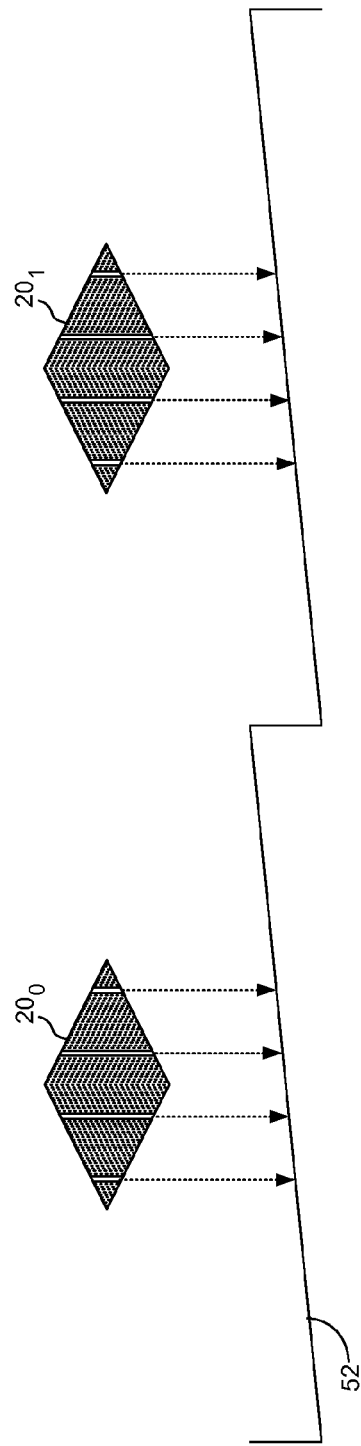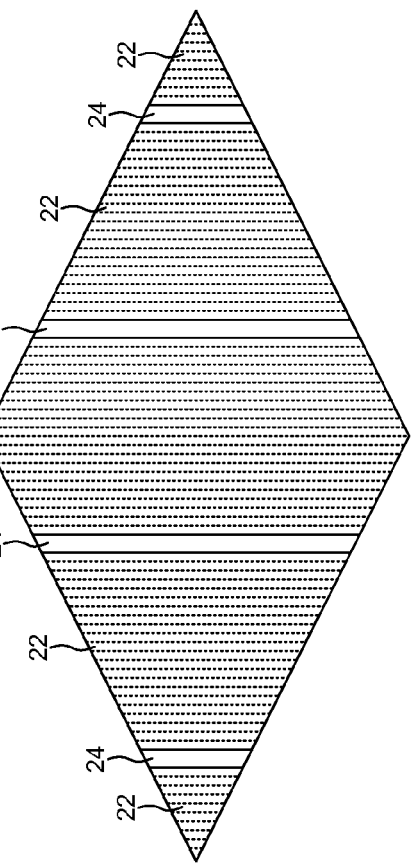
FIG. 4A
FIG. 4B

DISK DRIVE CENTERING SYNC FRAMES ON SYNC MARKS OF A SPIRAL TRACK

BACKGROUND

When manufacturing a disk drive, concentric servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the concentric servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

BRIEF DESCRIPTION OF THE DRAWINGS

FIG. 4A shows an embodiment of the present invention wherein a servo write clock is synchronized by clocking a modulo-N counter relative to when the sync marks in the spiral tracks are detected.

FIG. 4B shows an eye pattern generated by reading the spiral track, including the sync marks in the spiral track.

DETAILED DESCRIPTION OF EMBODIMENTS OF THE INVENTION

In an embodiment of the present invention, a disk drive comprises a head actuated over a disk including a plurality of spiral tracks, wherein each spiral track comprises a high frequency signal interrupted at a predetermined interval by a sync mark. The head is used to read the spiral tracks to generate a read signal representing spiral track crossings. A sync frame is first opened in response to a frame offset during a first revolution of the disk, wherein the sync frame corresponds to the head approaching a first sync mark in a first spiral track crossing. A sync frame position error signal (PES) is generated representing a difference between a target framing of the sync frame around the first sync mark and a detected framing of the sync frame around the first sync mark. The frame offset is adjusted in response to the sync frame PES, and the sync frame is second opened in response to the adjusted frame offset during a second revolution of the disk.

Figure 2A:
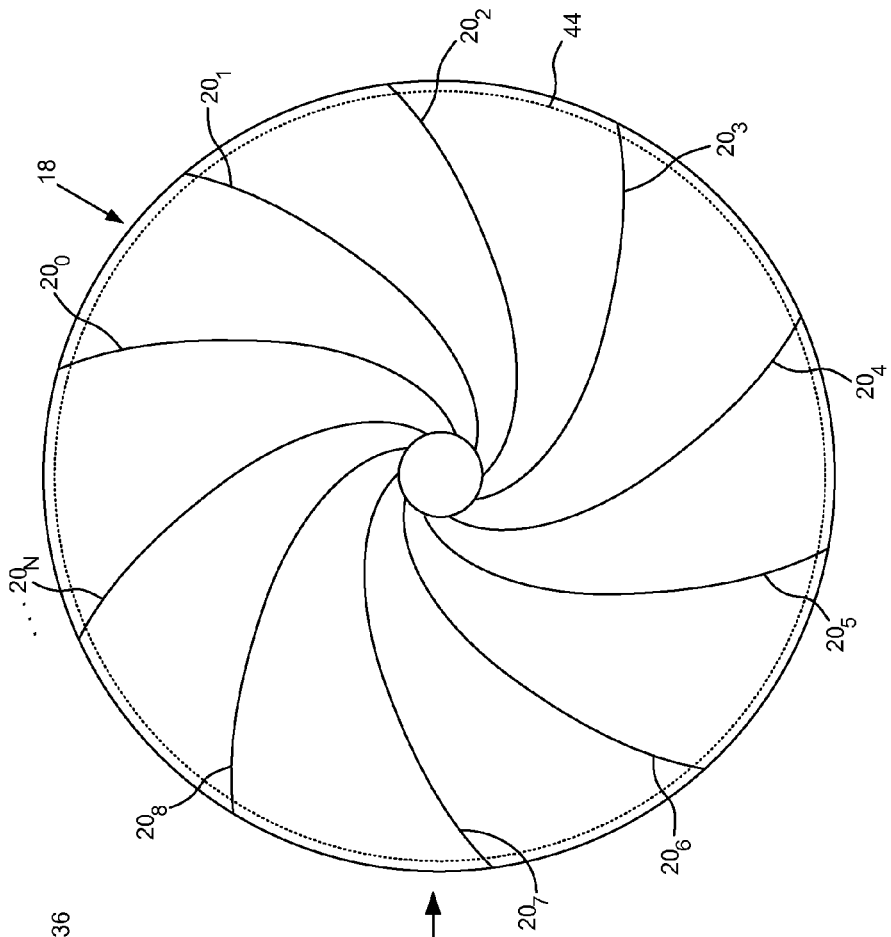
FIGS. 2A and 2B illustrate an embodiment of the present invention wherein an external spiral servo writer is used to write a plurality of spiral tracks to the disk for use in writing product servo sectors to the disk.
Figure 2B:
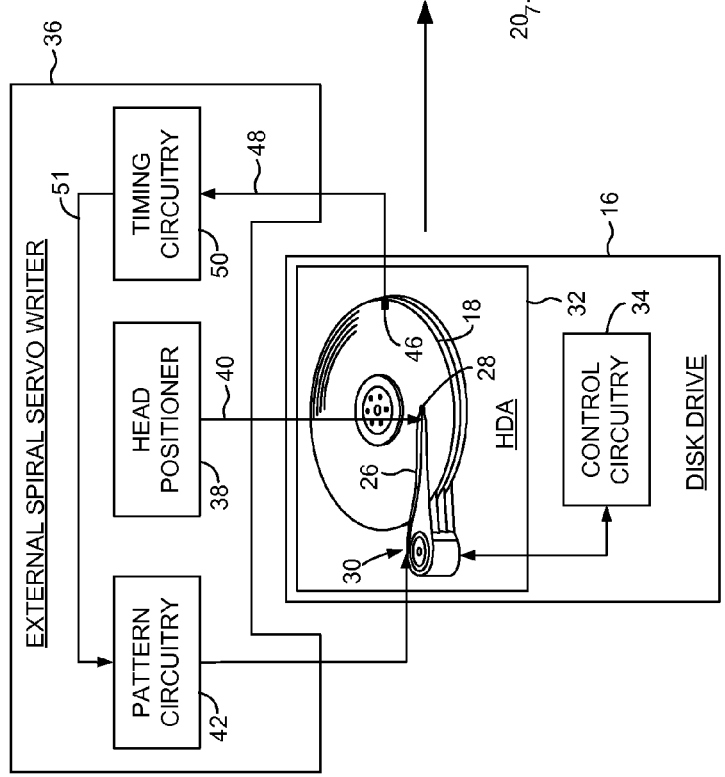

The spiral tracks may comprise any suitable pattern and may be written to the disk using any suitable technique, such as using an external writer for writing the spiral tracks to the disk, or stamping the spiral tracks on the disk using magnetic printing techniques. FIGS. 2A and 2B show an embodiment wherein a plurality of spiral tracks $20_0$-$20_N$ are written to a disk 18 of a disk drive 16 using an external spiral servo writer 36. The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$-$20_N$ are written on the disk 18 at a predetermined circular location determined from the write clock. Each spiral track $20_i$ comprises a high frequency signal 22 (FIG. 4B) interrupted at a predetermined interval by a sync mark 24.

The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$-$20_N$. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables a servo write clock to maintain synchronization while writing the product servo sectors to the disk.

Figure 3:
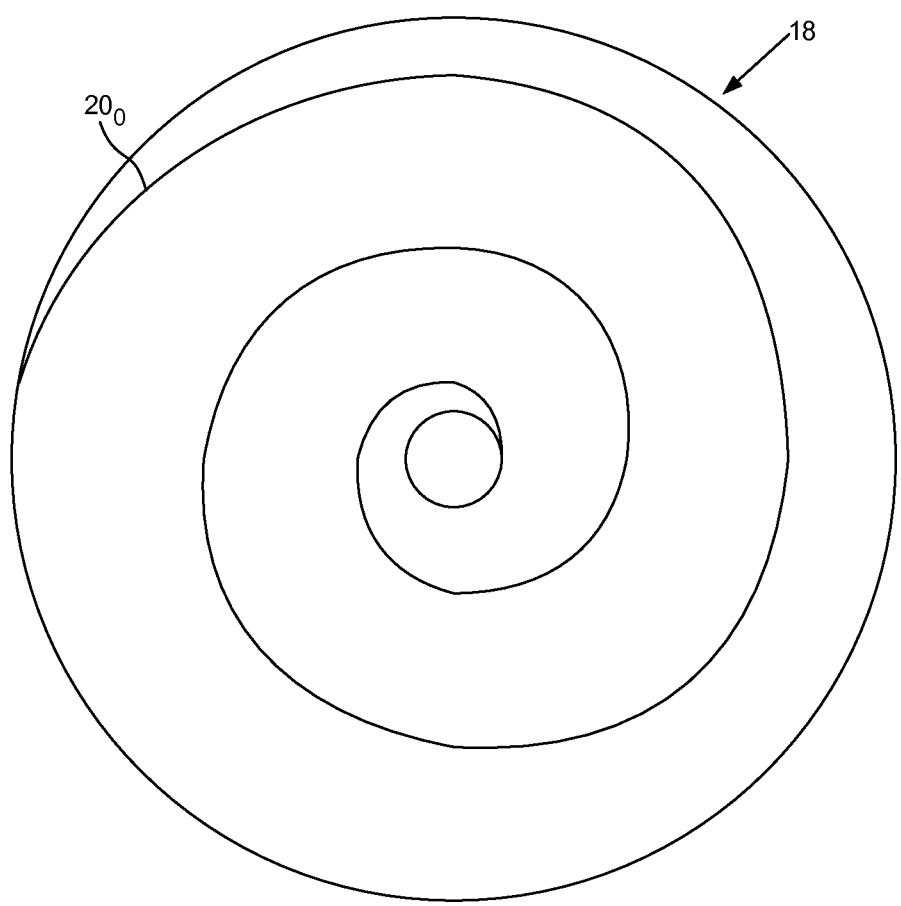
FIG. 3 illustrates an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$-$20_N$ in order to write the product servo sectors to the disk 18. In an alternative embodiment described below with reference to FIGS. 10 and 11, an external product servo writer is used to process the spiral tracks $20_0$-$20_N$ in order to write the product servo sectors to the disk 18 during a "fill operation".

FIG. 4B illustrates an "eye" pattern in the read signal that is generated when the head 28 crosses over a spiral track 20. The read signal representing the spiral track crossing comprises high frequency transitions 22 interrupted by sync marks 24 at a predetermined interval. When the head 28 moves in the radial direction, the eye pattern will shift (left or right) while the sync marks 24 remain fixed (ideally). The shift in the eye pattern (detected from the high frequency signal 22) relative to the sync marks 24 provides the off-track information (spiral position error signal (PES)) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL.

Figure 1:
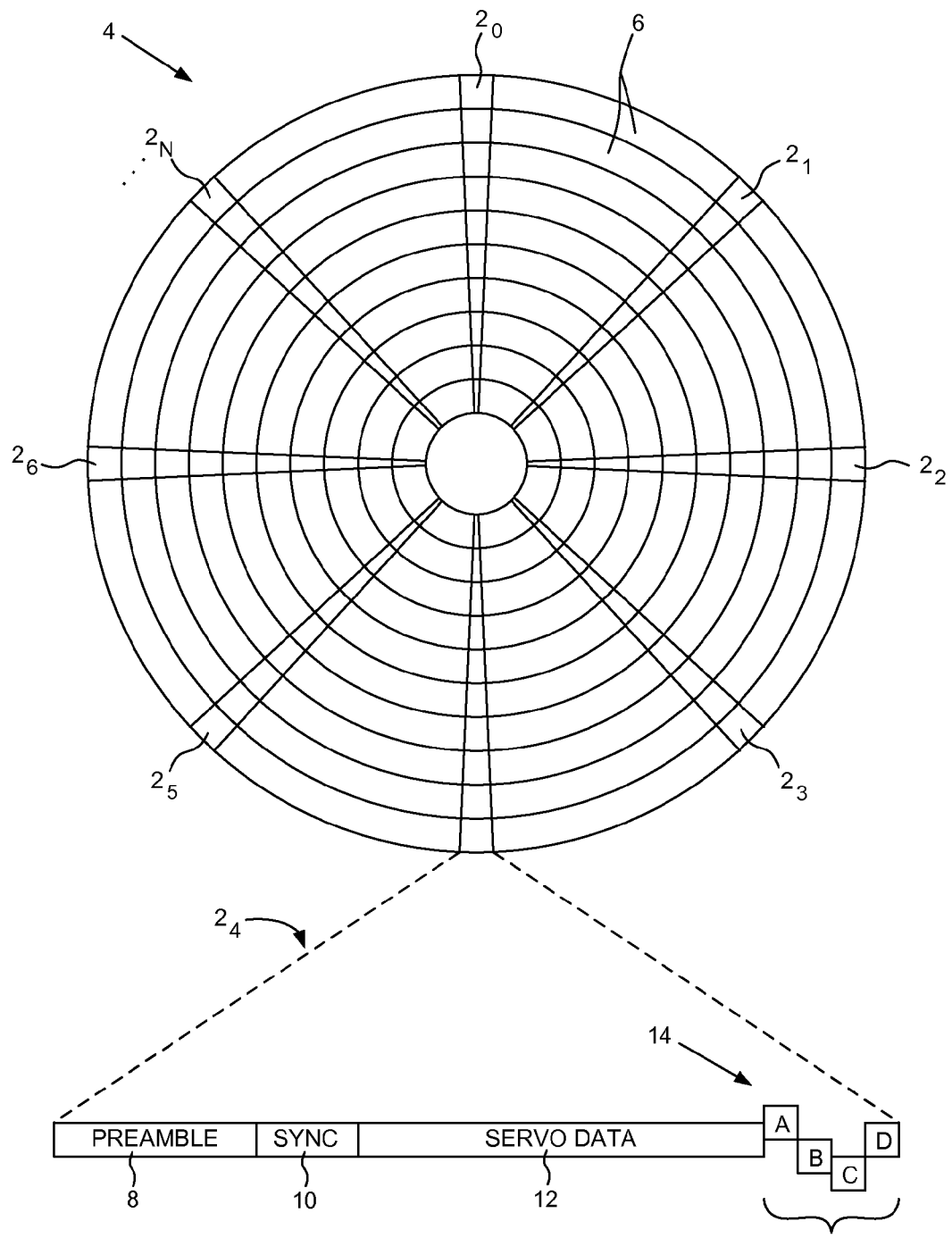
FIG. 1 shows a prior art disk format comprising a plurality of radially spaced, concentric tracks defined by a plurality of product servo sectors.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
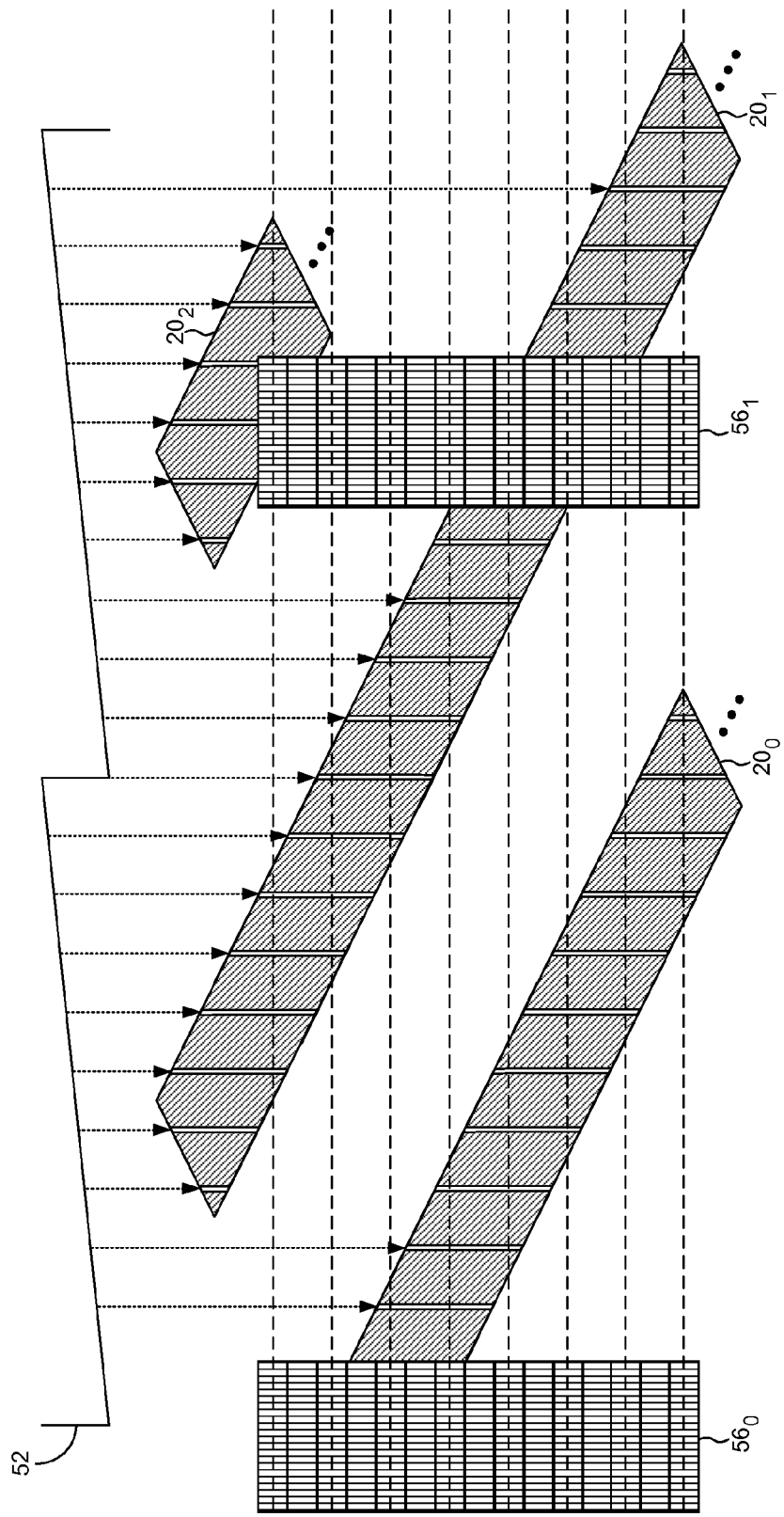
FIG. 5 illustrates writing of product servo sectors using a servo write clock generated from reading the spiral tracks.

FIG. 5 illustrates how the product servo sectors $56_0$-$56_N$ are written to the disk 18 after synchronizing the servo write clock in response to at least the sync marks 24 in the spiral tracks $20_0$-$20_N$. In the embodiment of FIG. 5, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5, each spiral track $20_0$-$20_N$ is wider than a data track, however, in an alternative embodiment the width of each spiral track $20_0$-$20_N$ is less than or proximate the width of a data track.

The spiral PES for maintaining the head 28 along a servo track (tracking) may be generated from the spiral tracks $20_0$-$20_N$ in any suitable manner. In one embodiment, the PES is generated by detecting the eye pattern in FIG. 4B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$-$20_N$ on the disk are processed in an interleaved manner to account for the product servo sectors $56_0$-$56_N$ overwriting a spiral track. For example, when writing the product servo sectors $56_1$ to the disk, spiral track $20_0$ is processed initially to generate the spiral PES tracking error and the servo write clock timing recovery measurement. When the product servo sectors $56_1$ begin to overwrite spiral track $20_1$, spiral track $20_o$ is processed to generate the spiral PES tracking error and the servo write clock timing recovery measurement.

Figure 6:
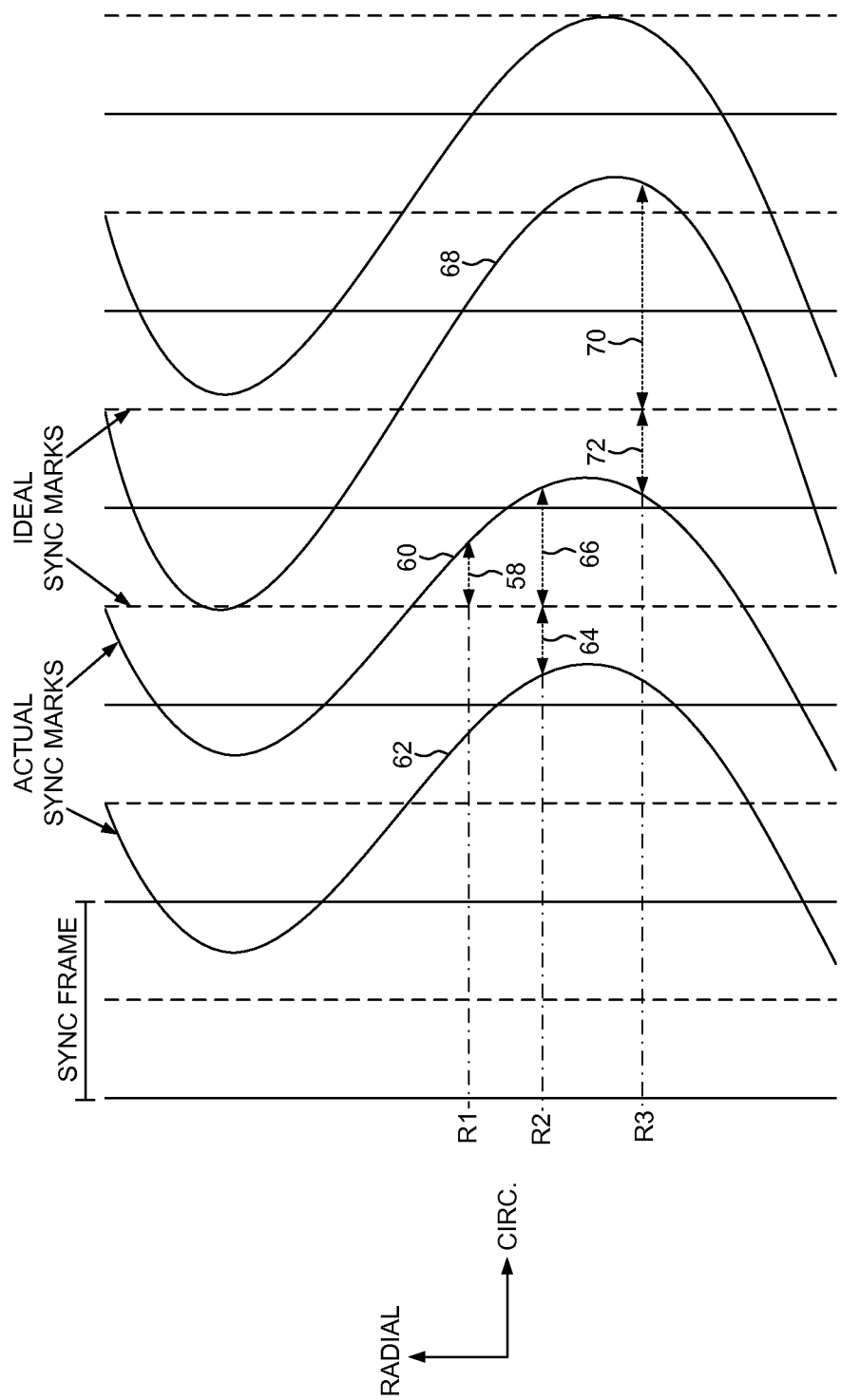
FIG. 6 shows how the sync marks in the spiral tracks may deviate from expected locations over the disk radius due to imperfections in writing and/or reading the spiral tracks.

Errors in writing the spiral tracks $20_0$-$20_N$ on the disk may cause the sync marks 24 to be written in a serpentine path (solid lines in FIG. 6), wherein the sync marks 24 should ideally align along a vertical line (dashed lines in FIG. 6). The serpentine path of the sync marks induces a phase error when synchronizing the servo write clock. In one embodiment, the phase error is measured as a difference between a target time for a sync mark (dashed line) and the actual time a sync mark is detected (solid line). For example in FIG. 6 when the head is positioned at radial location R1, a phase error 58 may be generated for sync mark 60 which is less than one-half a sync frame, where a sync frame represents a time between consecutive sync marks. When the sync marks deviate more than one-half a sync mark frame, an incorrect phase error may be generated. For example when the head is positioned at radial location R2, sync marks 60 and 62 have deviated into the adjacent sync mark frame. Accordingly, the phase error 64 may be generated incorrectly relative to sync mark 62 rather than the correct phase error 66 that should be generated relative to sync mark 60. The deviation of a sync mark may even exceed an entire sync frame as illustrated by sync mark 68 at radial location R3. The correct phase error 70 is therefore larger than a sync frame whereas the incorrect phase error 72 is less than one-half a sync frame. Generating incorrect phase errors can cause significant transients while attempting to synchronize the servo write clock.

Figure 7A:
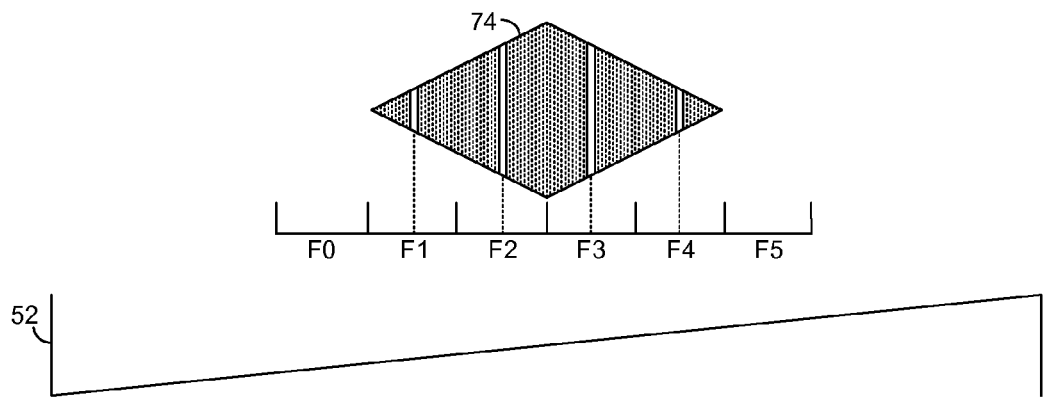
FIG. 7A illustrates an embodiment of the present invention wherein a plurality of sync frames are centered around the sync marks in a spiral track crossing.
Figure 7B:
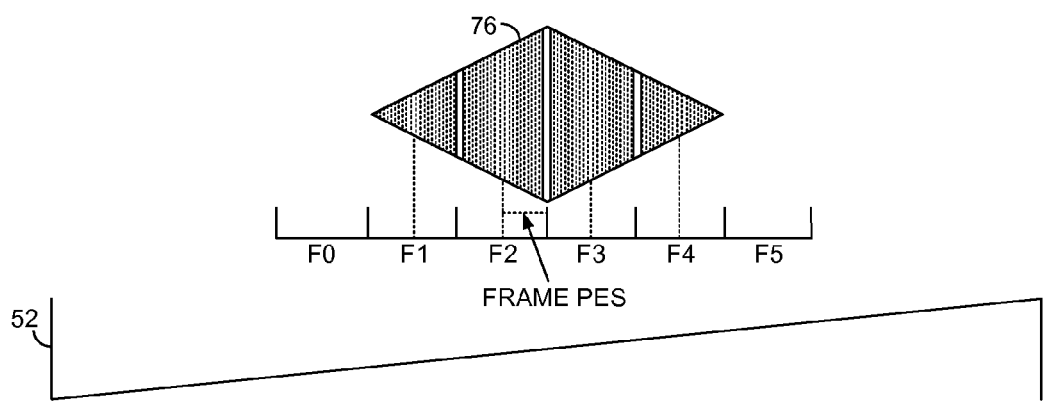
FIG. 7B illustrates an embodiment of the present invention wherein a sync frame position error signal (PES) representing a difference between a target framing of a sync frame around a sync mark and a detected framing of the sync frame around the sync mark.
Figure 7C:
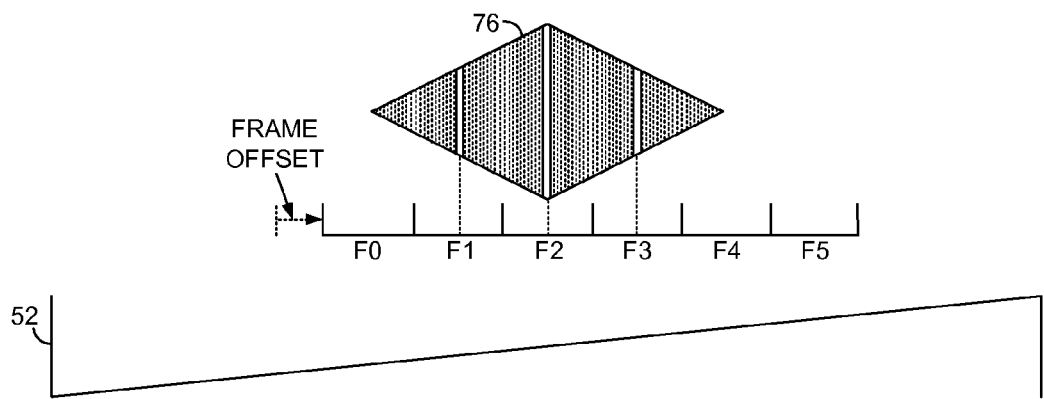
FIG. 7C illustrates an embodiment of the present invention wherein a frame offset is adjusted in response to the sync frame PES.

FIGS. 7A-7C illustrate an embodiment of the present invention wherein sync frames are adjusted in order to track the deviation in the sync marks shown in FIG. 6 as the head moves radially over the disk. FIG. 7A illustrates a spiral track crossing 74 and corresponding sync marks when the head is at a first radial location. A plurality of sync frames F0-F5 are shown, wherein sync frames F1-F4 are centered about their respective sync marks. FIG. 7B illustrates a spiral track crossing 76 at a different radial location (same circumferential location) wherein the sync marks have shifted right away from their initial location shown in FIG. 7A. A sync frame position error signal (PES) is therefore generated representing the this phase shift (phase error) in the detected sync marks relative to their target locations. The sync frame PES is used to adjust a frame offset for the sync frames so that during subsequent revolutions of the disk the sync frames are again centered about their respective sync marks as illustrated in FIG. 7C. FIGS. 7A-7C also show the saw-tooth waveform 52 representing the modulo-N counter wherein the phase error for synchronizing the servo write clock is generated relative to target modulo-N counter values and actual modulo-N counter values when the sync marks are detected. By shifting the sync frames so as to follow the deviation in the sync marks, the correct phase error can be generated (e.g., using the frame offset and the current sync frame PES).

Figure 8A:
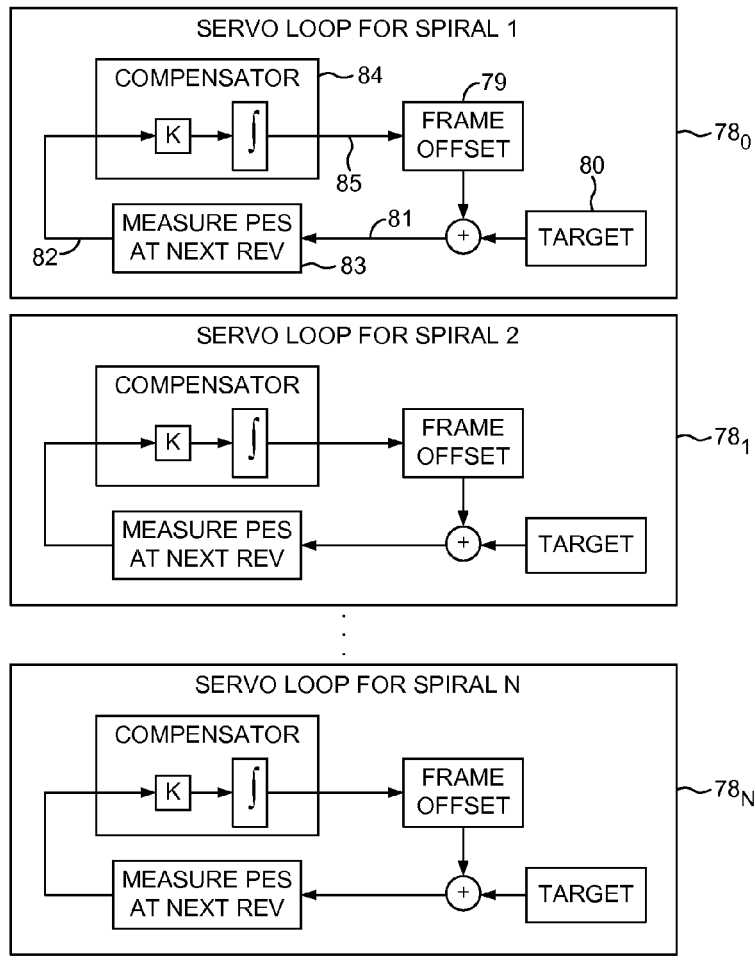
FIG. 8A illustrates an embodiment of the present invention wherein N servo loops are employed to adjust the sync frames corresponding to N spiral track crossings.

In an embodiment shown in FIG. 8A, N servo loops $58_0$-$58_N$ are employed to adjust the N frame offsets corresponding to N spiral track crossings so that the unique sync mark deviations in each spiral track crossing is accounted for. In the embodiment of FIG. 8A, a frame offset 79 adjusts a target 80 to generate the sync frames (as illustrated in FIGS. 7A-7C), wherein in one embodiment the target 80 corresponds to a target module-N counter value that a sync mark is expected to occur. The adjusted sync frames 81 are then opened during a next disk revolution and a sync frame position error signal (PES) 82 is generated 83 representing a framing error relative to the detected sync marks. A servo compensator 84 filters the sync frame PES 82 to generate a control signal 85 for adjusting the frame offset 79 in a direction that will reduce the sync frame PES 82. This process is repeated for each revolution of the disk, and in one embodiment, the process is repeated while seeking the head radially over the disk. In this manner, the sync frames track the deviations in the sync marks as the head moves radially over the disk as illustrated in FIG. 6.

Figure 8B:
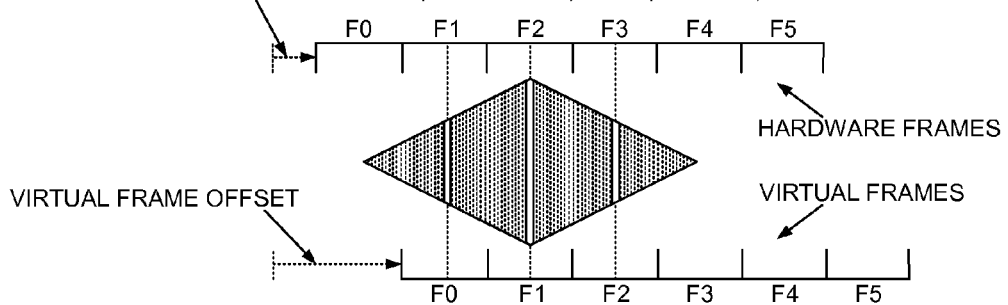
FIG. 8B illustrates an embodiment of the present invention wherein virtual frames are centered about target sync marks in a spiral track crossing, and hardware frames are centered about the nearest sync mark within a corresponding sync frame.

FIG. 8B shows an embodiment of the present invention wherein hardware sync frames are generated by hardware control signals representing physical frame boundaries within the read signal, and virtual sync frames are generated by software control signals representing virtual boundaries within the read signal. The hardware sync frames are constrained so as to not shift by more than one-half a sync frame (i.e., the hardware frame offset is less than one-half a sync frame), whereas the virtual sync frames may shift by more than a sync frame (i.e., the virtual frame offset may be greater than a sync frame). The hardware frame offset is generated as the modulo division of the virtual frame offset by half the sync frame. This embodiment may simplify the hardware design (generation of hardware sync frames) while still tracking significant deviations in the sync marks using the virtual sync frames.

In one embodiment, the hardware sync frames are used to demodulate the spiral track crossings, including the high frequency signal 22 between the sync marks 24 (FIG. 4B) in order to generate the spiral PES for servoing the head radially over the disk. Centering the hardware sync frames around their respective sync marks helps maintain a more consistent demodulation result as compared to demodulating with fixed sync frames around sync marks that may be shifting randomly as the head moves radially over the disk.

Figure 9A:
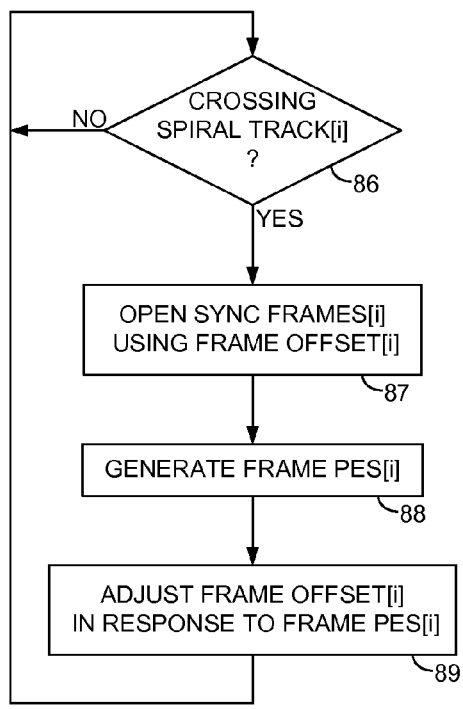
FIG. 9A is a flow diagram according to an embodiment of the present invention wherein during each revolution of the disk the frame offsets are updated using the sync frame PES measured at each spiral track crossing.

FIG. 9A is a flow diagram according to an embodiment of the present invention wherein when the head approaches a spiral track[i] (step 86), a corresponding sync frame[i] is opened in response to a frame offset during a first revolution of the disk (step 87). A sync frame PES[i] is generated representing a difference between a target framing of the sync frame[i] around a first sync mark and a detected framing of the sync frame[i] around the first sync mark (step 88). A corresponding frame offset[i] is adjusted in response to the sync frame PES[i] (step 89), and the sync frame[i] is second opened (step 87) in response to the adjusted frame offset[i] during a next revolution of the disk. The flow diagram of FIG. 9A is executed as the head crosses over each spiral track[i] (where i=0-N).

Figure 9B:
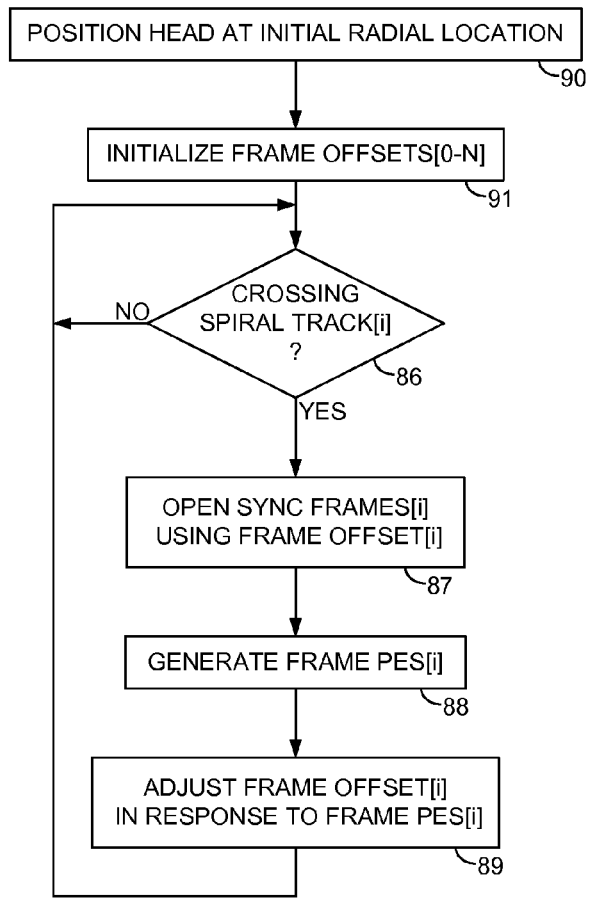
FIG. 9B is a flow diagram according to an embodiment of the present invention wherein the sync frame offsets are initialized after positioning the head at an initial radial location.

FIG. 9B is a flow diagram according to an embodiment of the present invention for initializing the frame offsets[0-N]. After loading the head over the disk surface, the head is positioned at an initial radial location (step 90) and the servo write clock is synchronized to at least the sync marks in the spiral track crossings as described above. In one embodiment, the head is maintained over the initial radial location by servoing off of the spiral tracks using any suitable algorithm for generating a spiral PES. In another embodiment, the head may be maintained at the initial radial location by servoing off of a band of concentric servo tracks that may be prerecorded on the disk (e.g., when writing the spiral tracks) and interleaved with the spiral tracks.

Once the spiral track crossings have been located, each frame offset[i] is initialized based on the initial location of the sync marks in the corresponding spiral track crossing[i]. In one embodiment, the frame offsets may be initialized to zero after centering each sync frame[i] about their respective sync marks. In another embodiment, each frame offset[i] may be initialized based on an average sync frame PES generated for the spiral track crossings. For example, a frame offset[i] may be initialized to zero if the sync frame PES generated for the corresponding spiral track crossing[i] matches the average sync frame PES, otherwise the frame offset[i] may be initialized to a non-zero value corresponding to the difference between the average sync frame PES and the actual sync frame PES. In either case, the sync frames are initially centered about their respective sync marks (using the initial zero or non-zero frame offset).

Figure 9C:
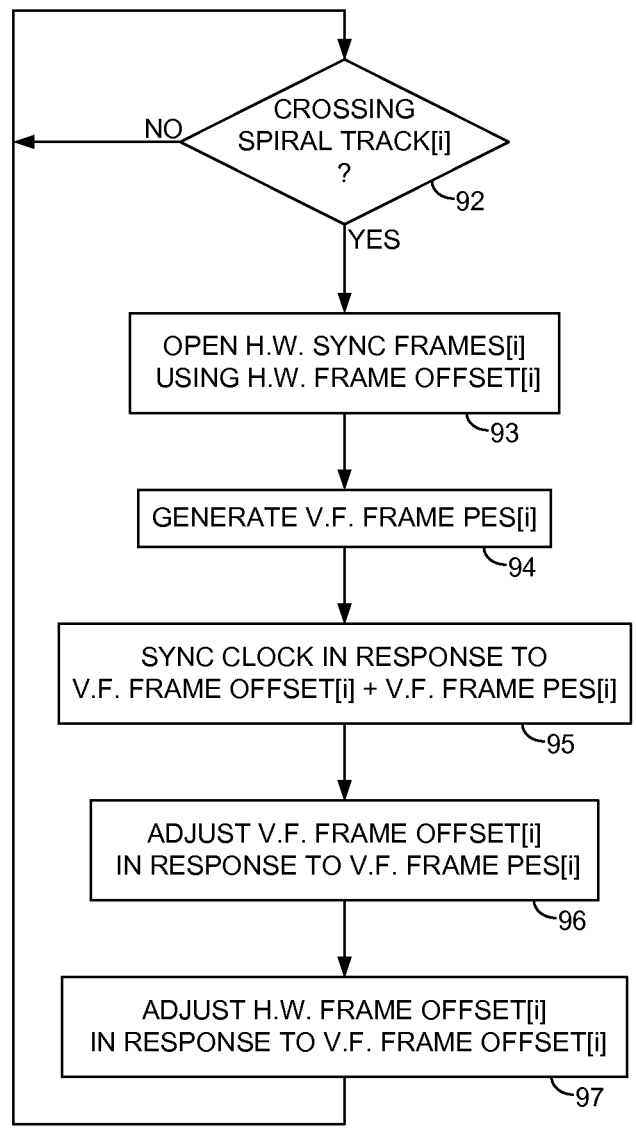
FIG. 9C is a flow diagram according to an embodiment of the present invention wherein hardware sync mark frames and virtual sync mark frames are adjusted at each spiral track crossing.

FIG. 9C is a flow diagram according to an embodiment of the present invention wherein when the head approaches a spiral track[i] (step 92), a corresponding hardware sync frame [i] is opened in response to a hardware frame offset during a first revolution of the disk (step 93). A virtual sync frame PES[i] is then generated relative to a virtual sync frame[i] (step 94), wherein the virtual sync frame[i] may be shifted by more than a full sync frame. A servo write clock is then synchronized in response to the virtual sync frame PES[i], such as by generating a phase error as the sum of a virtual frame offset[i] and the virtual sync frame PES[i] (step 95). The virtual frame offset[i] is then adjusted in response to the virtual sync frame PES[i] (step 96), and a hardware frame offset[i] is adjusted in response to the adjusted virtual frame offset[i] (step 97) as described above with reference to FIG. 8B.

Figure 10:
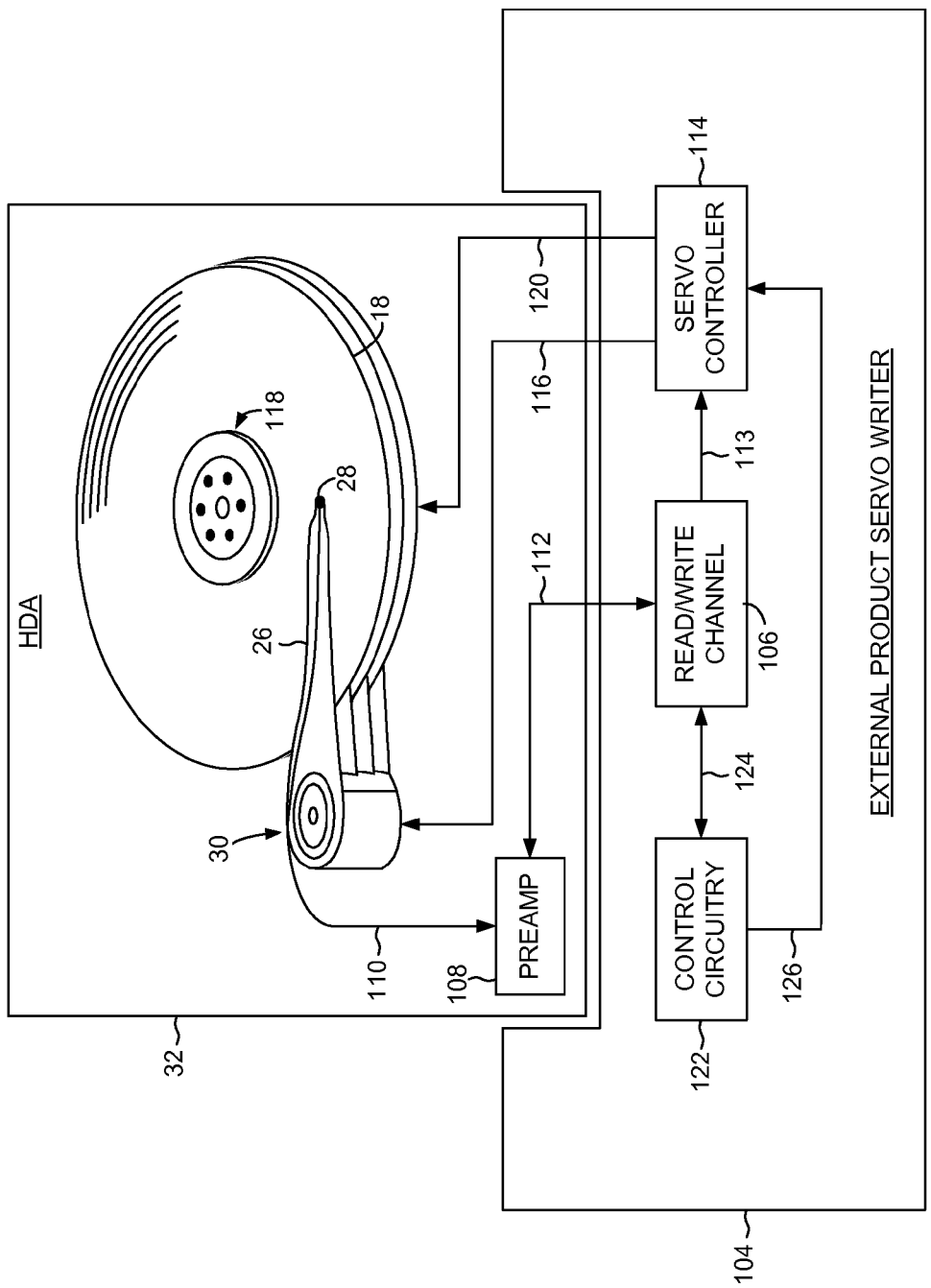
FIG. 10 illustrates an embodiment of the present invention wherein an external product servo writer is used to process the spiral tracks in order to write the product servo sectors to the disk.
Figure 11:
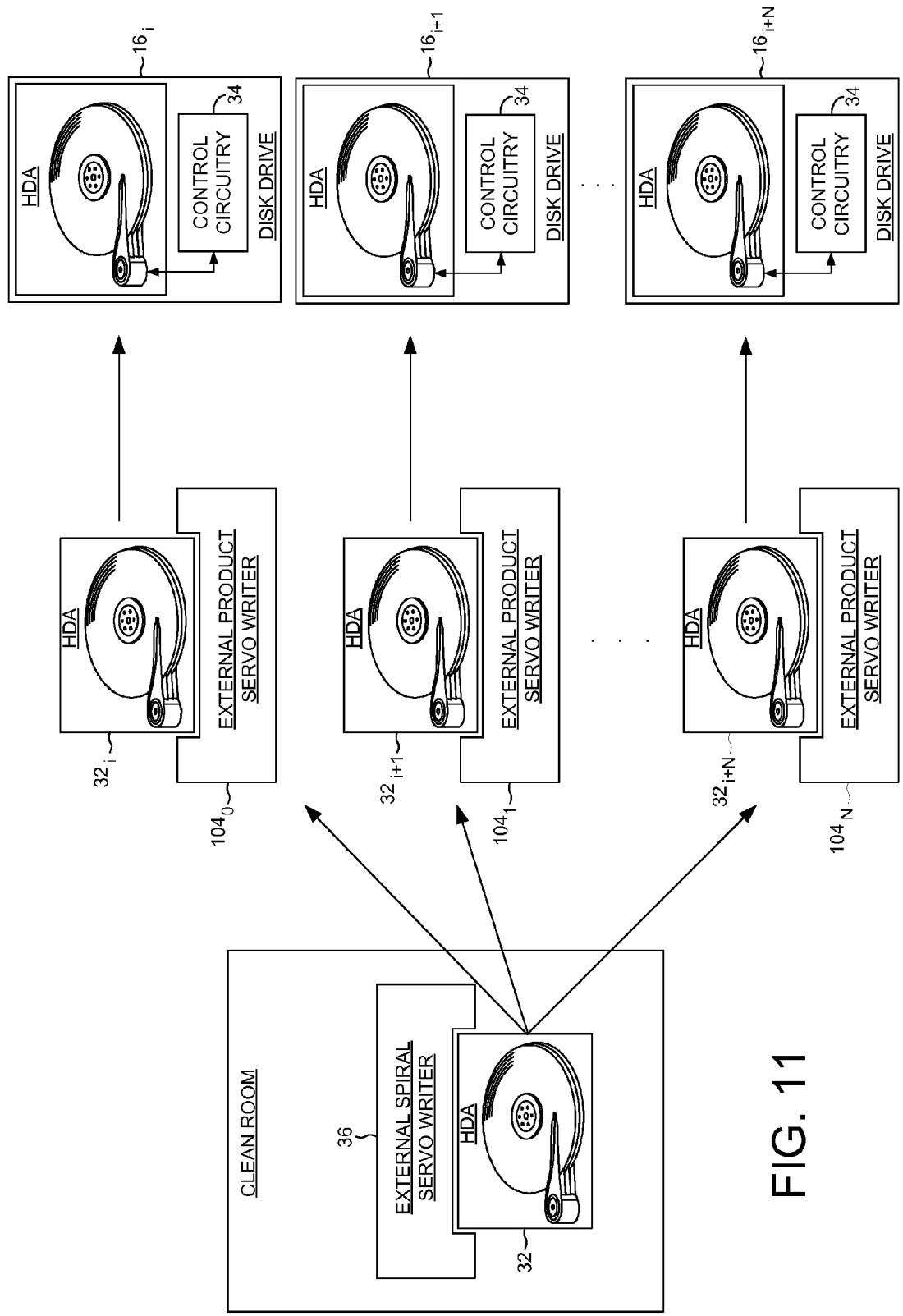
FIG. 11 illustrates an embodiment of the present invention wherein an external spiral servo writer is used to write the spiral tracks, and a plurality of external product servo writers write the product servo sectors for the HDAs output by the external spiral servo writer.

FIG. 10 shows an embodiment of the present invention wherein after writing the spiral tracks $20_0$-$20_N$ to the disk 18 (FIGS. 2A-2B), the HDA 32 is inserted into an external product servo writer 104 comprising suitable circuitry for reading and processing the spiral tracks $20_0$-$20_N$ in order to write the product servo sectors $56_0$-$56_N$ to the disk 18. The external product servo writer 104 comprises a read/write channel 106 for interfacing with a preamp 108 in the HDA 32. The preamp 108 amplifies a read signal emanating from the head 28 over line 110 to generate an amplified read signal applied to the read/write channel 106 over line 112. The read/write channel 106 comprises circuitry for generating servo burst signals 113 applied to a servo controller 114. The servo controller 114 processes the servo burst signals 113 to generate the PES. The PES is processed to generate a VCM control signal applied to the VCM 30 over line 116 in order to maintain the head 28 along a circular path while writing the product servo sectors $56_0$-$56_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the spiral tracks $20_0$-$20_N$ (e.g., timing information) and provides the product servo sector data to the read/write channel 106 at the appropriate time. The product servo sector data is provided to the preamp 108 which modulates a current in the head 28 in order to write the product servo sectors $56_0$-$56_N$ to the disk 18. The control circuitry 122 also transmits control information over line 126 to the servo controller 114 such as the target servo track to be written. After writing the product servo sectors $56_0$-$56_N$ to the disk 18, the HDA 32 is removed from the external product servo writer 104 and a printed circuit board assembly (PCBA) comprising the control circuitry 34 (FIG. 2A) is mounted to the HDA 32.

Figure 12:
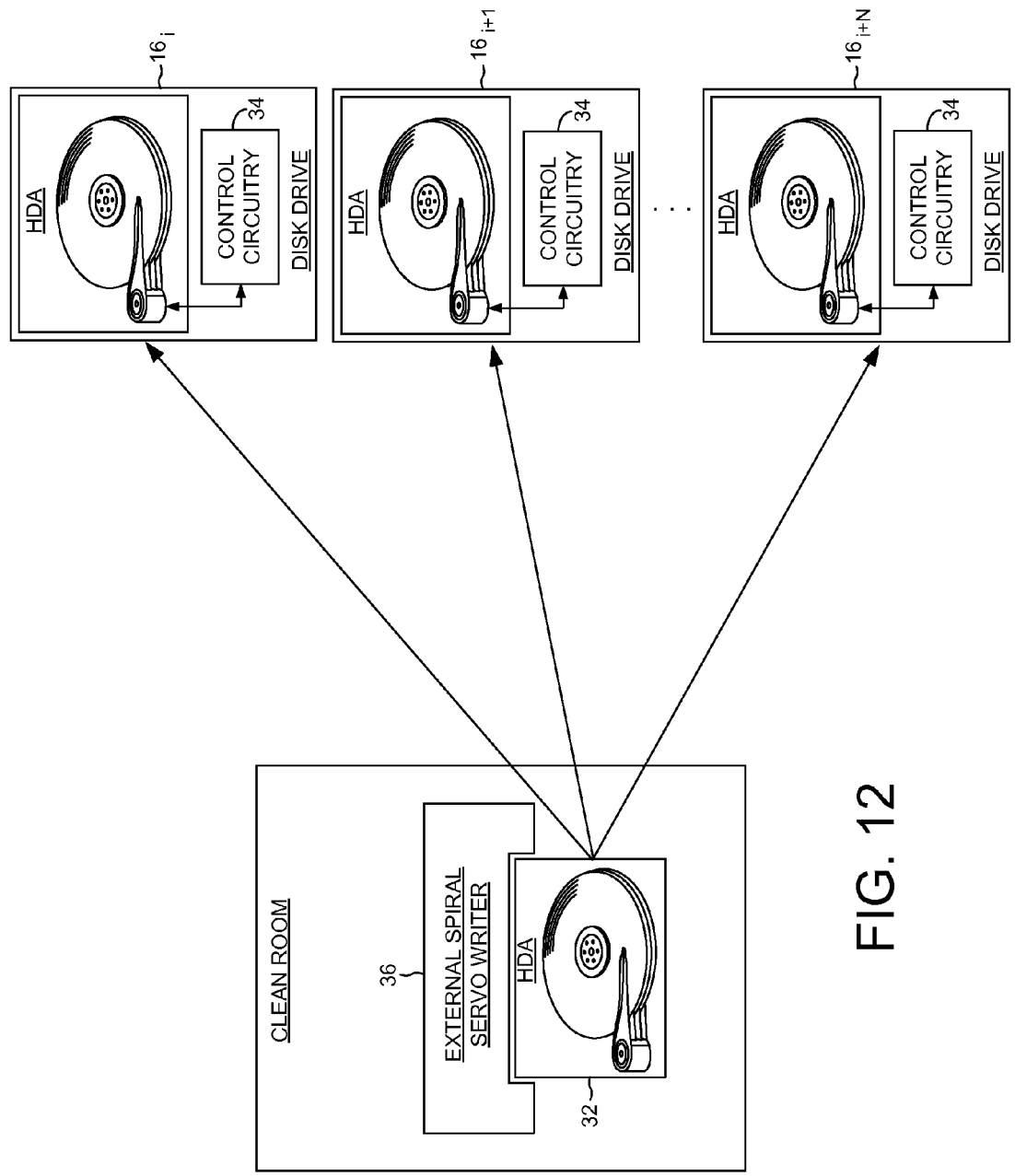
FIG. 12 illustrates an embodiment of the present invention wherein an external spiral servo writer is used to write the spiral tracks, and the control circuitry within each product disk drive is used to write the product servo sectors.

In one embodiment, the external product servo writer 104 of FIG. 10 interfaces with the HDA 32 over the same connections as the control circuitry 34 to minimize the modifications needed to facilitate the external product servo writer 104. The external product servo writer 104 is less expensive than a conventional servo writer because it does not require a clean room or sophisticated head positioning mechanics. In an embodiment shown in FIG. 11, a plurality of external product servo writers $104_0$-$104_N$ process the HDAs $32_{i-i+N}$ output by an external spiral servo writer 36 in order to write the product servo sectors less expensively and more efficiently than a conventional servo writer. In an alternative embodiment shown in FIG. 12, an external spiral servo writer 36 or an external media writer is used to write the spiral tracks, and the control circuitry 34 within each product disk drive $16_0$-$16_N$ is used to write the product servo sectors.

Any suitable control circuitry may be employed to implement the flow diagrams in the embodiments of the present invention, such as any suitable integrated circuit or circuits. In the embodiment wherein the product servo sectors are self-written by each disk drive, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of spiral tracks, each spiral track comprising a high frequency signal interrupted at a predetermined interval by a sync mark;
   a head actuated over the disk; and
   control circuitry operable to:
      use the head to read the spiral tracks to generate a read signal representing spiral track crossings;
      first open a first sync frame in response to a first frame offset during a first revolution of the disk, wherein the first sync frame corresponds to the head approaching a first sync mark in a first spiral track crossing;

generate a first sync frame position error signal (PES) representing a difference between a target framing of the first sync frame around the first sync mark and a detected framing of the first sync frame around the first sync mark;

adjust the first frame offset in response to the first sync frame PES; and second open the first sync frame in response to the adjusted first frame offset during a second revolution of the disk.

2. The disk drive as recited in claim 1, wherein the target framing corresponds to the first sync mark occurring at a center of the first sync frame.

3. The disk drive as recited in claim 1, wherein the control circuitry is further operable to synchronize a clock to a rotation of the disk in response to the sync frame PES.

4. The disk drive as recited in claim 1, wherein the control circuitry is further operable to generate the first sync frame by generating hardware control signals representing physical frame boundaries within the read signal.

5. The disk drive as recited in claim 4, wherein the first frame offset is less than one-half the predetermined interval.

6. The disk drive as recited in claim 1, wherein the control circuitry is further operable to generate the first sync frame by generating software control signals representing virtual boundaries within the read signal.

7. The disk drive as recited in claim 6, wherein the first frame offset is greater than one-half the predetermined interval.

8. The disk drive as recited in claim 7, wherein the first frame offset is greater than the predetermined interval.

9. The disk drive as recited in claim 1, wherein the control circuitry is further operable to:
position the head at an initial radial location over the disk; and
initialize the first frame offset.

10. The disk drive as recited in claim 1, wherein the control circuitry is further operable to:
first open a second sync frame in response a second frame offset during the first revolution of the disk, wherein the second sync frame corresponds to the head approaching a second sync mark in a second spiral track crossing;
generate a second sync frame position error signal (PES) representing a difference between a target framing of the second sync frame around the second sync mark and a detected framing of the second sync frame around the second sync mark;
adjust the second frame offset in response to the second sync frame PES; and
second open the second sync frame in response to the adjusted second frame offset during the second revolution of the disk.

11. A method of operating a disk drive, the disk drive comprising a head actuated over a disk comprising a plurality of spiral tracks, each spiral track comprising a high frequency signal interrupted at a predetermined interval by a sync mark, the method comprising:

using the head to read the spiral tracks to generate a read signal representing spiral track crossings;

first opening a first sync frame in response to a first frame offset during a first revolution of the disk, wherein the first sync frame corresponds to the head approaching a first sync mark in a first spiral track crossing;

generating a first sync frame position error signal (PES) representing a difference between a target framing of the first sync frame around the first sync mark and a detected framing of the first sync frame around the first sync mark;

adjusting the first frame offset in response to the first sync frame PES; and second opening the first sync frame in response to the adjusted first frame offset during a second revolution of the disk.

12. The method as recited in claim 11, wherein the target framing corresponds to the first sync mark occurring at a center of the first sync frame.

13. The method as recited in claim 11, further comprising synchronizing a clock to a rotation of the disk in response to the sync frame PES.

14. The method as recited in claim 11, further comprising generating the first sync frame by generating hardware control signals representing physical frame boundaries within the read signal.

15. The method as recited in claim 14, wherein the first frame offset is less than one-half the predetermined interval.

16. The method as recited in claim 11, further comprising generating the first sync frame by generating software control signals representing virtual boundaries within the read signal.

17. The method as recited in claim 16, wherein the first frame offset is greater than one-half the predetermined interval.

18. The method as recited in claim 17, wherein the first frame offset is greater than the predetermined interval.

19. The method as recited in claim 11, further comprising:
positioning the head at an initial radial location over the disk; and
initializing the first frame offset.

20. The method as recited in claim 11, further comprising:
first opening a second sync frame in response a second frame offset during the first revolution of the disk, wherein the second sync frame corresponds to the head approaching a second sync mark in a second spiral track crossing;
generating a second sync frame position error signal (PES) representing a difference between a target framing of the second sync frame around the second sync mark and a detected framing of the second sync frame around the second sync mark;
adjusting the second frame offset in response to the second sync frame PES; and
second opening the second sync frame in response to the adjusted second frame offset during the second revolution of the disk.

* * * * *